United States Patent [19]

Iwasa et al.

[11] Patent Number: 5,833,746
[45] Date of Patent: Nov. 10, 1998

[54] SILICA FILLER AND METHOD FOR ITS PRODUCTION

[75] Inventors: Mitsuyoshi Iwasa; Yukio Sakaguchi; Hirofumi Simazoe, all of Omuta, Japan

[73] Assignee: Denki Kagaku Kogyo Kabushiki Kaisha, Tokyo, Japan

[21] Appl. No.: 929,091

[22] Filed: Sep. 15, 1997

[30] Foreign Application Priority Data

Sep. 18, 1996 [JP] Japan ................................ 8-266647

[51] Int. Cl.$^6$ .............................. C04B 14/04; C09C 1/28
[52] U.S. Cl. .................. 106/482; 106/491; 106/287.34; 423/335; 523/443; 523/223; 523/220; 524/492; 524/493
[58] Field of Search ................................ 106/482, 491, 106/287.34; 423/335; 428/331; 523/223, 220, 216, 443; 524/492, 493

[56] References Cited

U.S. PATENT DOCUMENTS

| 4,615,741 | 10/1986 | Kobayashi et al. | 106/482 |
| 4,704,425 | 11/1987 | Lagarde et al. | 106/482 |
| 4,816,299 | 3/1989 | Alpha et al. | 523/443 |
| 5,030,433 | 7/1991 | Mehrotra | 106/482 |
| 5,137,940 | 8/1992 | Tomiyoshi et al. | 523/220 |

Primary Examiner—Michael Marcheschi
Attorney, Agent, or Firm—Oblon, Spivak, McClelland, Maier & Neustadt, P.C.

[57] ABSTRACT

A silica filler containing from 30 to 90 wt % of particles having a particle size of at least 30 μm, wherein the roundness of the particles having a particle size of at least 30 μm, is from 0.83 to 0.94.

4 Claims, No Drawings

SILICA FILLER AND METHOD FOR ITS PRODUCTION

BACKGROUND OF THE INVENTION

1. Field of the Invention

The present invention relates to a silica filler which has a low thermal expansion property and an electrical insulation property, which is blended with a synthetic resin material and used for encapsulating semiconductor chips. More particularly, it relates to a silica filler which, when blended with various synthetic resins, provides a high level of loading and high flowability without lowering the strength of the encapsulating compound.

2. Discussion of Background

Recently, in semiconductor industry, high performance of an encapsulating compound for semiconductor chips has been required along with a progress in high integration of semiconductors. To meet the requirement for high performance, various synthetic resins have been developed, and on the other hand, various materials have been developed as the filler.

For example, a surface mounting type package is exposed in its entirety to a high temperature during the soldering process, whereby the moisture absorbed in the package is rapidly vaporized, and in the case of a thin package, package cracks are likely to form.

Therefore, it has been proposed to have a fused silica filler highly loaded to reduce the amount of a hygroscopic epoxy resin, as an effective measure. However, with a conventional filler of pulverized type, if the loading ratio is increased, the viscosity tends to increase to bring about a problem in moldability. Accordingly, a spherical silica filler excellent in flowability even under a high loading condition of the filler, has been used. Heretofore, it has been considered that as the filler is close to complete round, the loading property, the flowability and the anti-mold abrading property will improve, and a filler having a high degree of roundness has been desired. For example, JP-A-3-66151 and JP-A-3-177450 propose to use, as an index for sphericity, "(Wadell's sphericity" represented by "the diameter of a circle equal to the projected area of a particle)÷(the diameter of the minimum circle circumscribing the projected image of the particle)", and propose a filler having a sphericity of this value being from 0.7 to 1.0. However, for current high loading requirement, flowability is still low even when a filler having this value being at least 0.7, is employed, and a further improvement has been desired.

Further, a study has been made to improve the loading property or the anti-flash property by optimizing the particle size distribution of the filler. JP-A-7-25607 discloses that when particles having a particle size of at least 32 $\mu$m are at least 40% and the numerical value obtained by dividing the content of particles having a particle size of at most 32 $\mu$m by the content of particles having a particle size of at most 3 $\mu$m, is at most 3, such will contribute to improvement of the flowability.

If the loading ratio of a filler is increased, there will be a problem such that the flowability of the encapsulating compound tends to be low, and the moldability or the like tends to deteriorate. The filler is required to have a low thermal expansion property and an electrical insulating property by itself, and besides, it is required to have a loading property, flowability, strength-retaining property and anti-mold abrading property, whereby the performance as an encapsulating compound can be maintained as blended in a large amount to various synthetic resins.

SUMMARY OF THE INVENTION

The present inventors have conducted an extensive research to obtain a silica filler having a high loading property and high flowability, and have found that the most harmful particles which deteriorate the flowability, are those having surface irregularities increased by aggregation during fusing or by fusion of particles to one another. They have also found that the "roundness" represented by "(the projected area of a particle)÷(the area of a circle having the same circumference as the projected perimeter of the particle)", is useful as an index for the proportion of such harmful particles present. The "roundness" has a feature that it more readily reflects the irregularities of the particle surface than the "Wadell's sphericity" or the "aspect ratio", since the projected perimeter of the particle is used for the determination. They have also studied the relation between the particle size distribution of silica and the roundness, and have found a filler whereby high flowability and high strength can be maintained even when loaded in a large amount, a method for its preparation and a resin composition for encapsulating semiconductor chips having such a filler loaded therein.

It is an object of the present invention to solve the above-mentioned problems.

The present invention provides a silica filler containing from 30 to 90 wt % of particles having a particle size of at least 30 $\mu$m, wherein the roundness of the particles having a particle size of at least 30 $\mu$m, is from 0.83 to 0.94. Preferably, the roundness of the particles having a particle size of less than 30 $\mu$m is from 0.73 to 0.90.

Further, the present invention provides a resin composition for encapsulating semiconductors, which contains from 80 to 95 wt % of such a silica filler.

Still further, the present invention provides a method for producing such a silica filler, which comprises using a silica powder having an average particle size of from 20 to 70 $\mu$m and containing at most 25 wt % of particles having a particle size of at most 10 $\mu$m, as a raw material, and fusing it in a combustible gas-oxygen flame while supplying it at such a rate that the ratio of the amount (kg) of the silica powder raw material to the amount (Nm$^3$) of the combustible gas is within a range of from 1 to 4 (based on the calorific value of propane gas).

The present inventors have pursued a spherical silica close to complete round, and in the course of the pursuit, they have found a fact that if the roundness is too high, the flexural strength tends to deteriorate when such a filler is incorporated in a high proportion. Namely, when the roundness of particles having a particle size of at least 30 $\mu$m i.e. slightly large particles, is from 0.83 to 0.94, high flexural strength can be maintained without impairing overall flowability.

As a result of further pursuit, it has been found that the particle size distribution of the starting material fine powder contributes substantially to the roundness of the filler after fusing, and if fine powder of at most 10 $\mu$m is present in a large amount in the silica raw material powder, such fine powder is likely to aggregate during fusing or adhere to coarse particles to deteriorate the roundness and at the same time to increase the average particle size.

Accordingly, by removing fine powder and by reducing the feeding amount of the silica powder raw material relative to the amount of the combustible gas, unified sphericity of particles having a particle size of from 30 to 100 μm can effectively be carried out.

The present invention provides a silica filler having a preferred particle size distribution and the optimal roundness and having a high loading ratio to various resins useful for encapsulating semiconductor chips, and a method for its preparation, and it also provides an encapsulating compound having high flexural strength, which is obtained by highly loading such a filler.

DETAILED DESCRIPTION OF THE PREFERRED EMBODIMENTS

The silica raw material to be used as a starting material of the present invention, is prepared by pulverizing silica stone, rock crystal or silica sand composed of $SiO_2$ of high purity and relatively good quality, by a means such as a vibration mill, or by such pulverization followed by classification. The starting material also may be prepared by granulating silica material having a particle size of at most 10 μm, with an inorganic binder. Otherwise, a powder after classification containing high purity $SiO_2$ may be used. In short, it may be one having high purity and having an average particle size of from 20 to 70 μm, wherein the content of fine powder having a particle size of at most 10 μm is not more than 25 wt %. If the particle size of the silica fine powder is outside the range of from 20 to 70 μm, it tends to be difficult to obtain the desirable roundness and particle size distribution after fusing. Further, if the amount of particles having a particle size of at most 10 μm exceeds 25 wt %, aggregation tends to take place during fusing or the fine powder of at most 10 μm tends to adhere to coarse particles, whereby the roundness of the coarse particles tends to deteriorate, and at the same time, the average particle size tends to increase.

The particle size of the silica filler obtained by fusing treatment is such that the content of particles having a particle size of at least 30 μm is from 30 to 90 wt %, preferably from 33 to 70 wt %. If it is less than 30 wt %, no adequate flowability tends to be obtained, and when a resin composition for encapsulating semiconductors is prepared, the flexural strength tends to be low. On the other hand, if it exceeds 90 wt %, no adequate flowability tends to be obtained.

The roundness is obtained by image analysis of a projected image of each particle, obtained by e.g. a scanning electron microscope or a stereoscopic microscope. In the present invention, as the scanning electron microscope, JSM-T200 Model, manufactured by Nippon Denshi K.K., was used, and as the image analyzing apparatus, one manufactured by Nippon Abionics K.K. was used. However, similar numerical values can be obtained also when products by other companies are used.

The roundness is defined by "(the projected area of a particle)÷(the area of a particle having the same circumference as the projected perimeter of the particle)".

As the method for determining the roundness, firstly the projected area (A) of the object and the projected perimeter (PM) of the object are measured from a microscopic photograph. When the area of complete round with a perimeter which equal to PM is B, the roundness is represented by A/B.

When complete round with the same circumferential length as the perimeter (PM) of the object, is assumed, $$PM = 2\pi r \quad (1)$$

$$B = \pi r^2 \quad (2)$$

Accordingly, from the formula (1), $$r = PM/2\pi \quad (3)$$

When the formula (3) is substituted for the formula (2), $B = \pi \times (PM/2\pi)^2$.

Accordingly $$B = (PM)^2/4\pi \quad (4)$$

Thus, $$\text{the roundness} = A/B = A \times 4\pi/(PM)^2 \quad (5)$$

By substituting the actually measured values A and PM for the formula (5), the roundness of each individual particle can be calculated.

Sampling of particles is carried out to represent the particle size distribution of the powder, followed by measurement. The object particles are grouped by the particle sizes of measured particles (circle-corresponding diameters=diameters of complete round having areas equal to the projected areas: Heywood diameter), and the roundness of particles of at least 30 μm and the roundness of particles of less than 30 μm are represented by the average values for the respective object particles. The larger the number of object particles in the respective groups, the higher the reliability of the measured values. However, taking also the measuring time into consideration, it is usual to determine the roundness as an average value of about 100 particles.

The roundness of silica filler particles having a particle size of at least 30 μm is from 0.83 to 0.94, preferably from 0.84 to 0.93. If the roundness of the silica filler particles is less than 0.83, the flowability tends to be inadequate, and when highly loaded to a resin for semiconductor chips, the moldability tends to be poor, and the flexural strength tends to be low. Further, if the roundness exceeds 0.94, the flexural strength tends to deteriorate when such filler particles are highly loaded in a resin for semiconductor chips.

Further, with respect to the silica filler particles having a particle size of less than 30 μm, the roundness is preferably from 0.73 to 0.90, more preferably from 0.75 to 0.85. When the roundness of the silica filler particles having a particle size of less than 30 μm, is from 0.73 to 0.90, the flowability and the flexural strength when such particles are highly loaded to a resin, will further be improved.

The synthetic resin material to be used in the present invention is not particularly limited so long as it is a material useful as an encapsulating compound for semiconductor chips. For example, an epoxy resin such as a phenol novolak type epoxy resin, an o-cresol novolak type epoxy resin or a bishydroxybiphenyl type epoxy resin, may, for example, be mentioned. For an epoxy resin, a curing agent such as phenol or cresol is usually employed. Further, as a synthetic resin material, a polymaleimide compound having two or more maleimide groups, may also be mentioned.

To such a synthetic resin material, the silica filler of the present invention is loaded in an amount of from 80 to 95 wt % based on the entire composition. If the loading ratio is less than 80%, the thermal expansion of the encapsulating compound tends to be large, and if it exceeds 95 wt %, the flowability tends to be low.

To the synthetic resin material, other additives such as a curing agent, a curing accelerator, a release agent, a coloring agent, etc., may be incorporated.

To produce the silica filler of the present invention, a silica powder having an average particle size of from 20 to 70 μm and containing at most 25 wt % of particles having a particle size of at most 10 μm, is used as a raw material, and the raw material is spheroidized by thermal spraying into a combustible gas-oxygen flame using oxygen as a carrier gas. As the combustible gas, a combustible gas such as propane gas, butane or acetylene may, for example, be mentioned, or a gas mixture thereof may be used.

For the thermal spraying, the ratio of the amount (kg) of the silica powder raw material to the amount ($Nm^3$) of the combustible gas, is adjusted to a level of from 1 to 4, preferably from 1.5 to 3.5. The numerical value of from 1 to 4 is a numerical value in a case where propane gas is used as the combustible gas. The calorific value of 1 $Nm^3$ varies depending upon the combustible gas, and a proper ratio of the amount (kg) of the silica powder raw material to the amount ($Nm^3$) of the combustible gas likewise varies depending upon the type of the combustible gas to be used. Accordingly, in the present invention, such a ratio is expressed based on propane gas which is commonly used. Accordingly, when other combustible gas is to be used, the ratio of the calorific value of that gas to the calorific value of propane gas is obtained, and the numerical value corresponding to this ratio is a proper numerical value.

If the ratio of the amount (kg) of the silica powder raw material to the amount of the combustible gas ($Nm^3$ as propane gas) is less than 1, the roundness of particles having a particle size of at least 30 μm tends to exceed 0.94, and if the above ratio exceeds 4, the roundness of particles having a particle size of at least 30 μm will not reach 0.83. In either case, it tends to be difficult to obtain the silica filler of the present invention.

The silica filler of the present invention is not necessarily used alone. In some cases, it may be used in proper combination as a mixture with e.g. aluminum nitride, silicon nitride, alumina, zirconia, boron nitride, calcium carbonate or talc.

Now, the present invention will be described in further detail with reference to Examples and Comparative Examples. However, it should be understood that the present invention is by no means restricted by such specific Examples.

EXAMPLES 1 to 3 and COMPARATIVE EXAMPLES 1 to 4

Natural silica stone was pulverized, or pulverized and then classified, to obtain a silica powder raw material having the characteristics as identified in Table 1. The roundness of the silica powder raw material was from 0.6 to 0.75.

Using such a silica powder as a raw material, it was introduced by a carrier gas into a propane gas-oxygen flame and fused and spheroidized. At that time, the ratio of the amount (kg/hr) of the silica powder raw material to the amount ($Nm^3$/hr) of propane gas was 2.5, and the discharge velocity of the raw material was from 25 to 35 m/sec.

The fused product was collected, and its average particle size, the wt % of particles having a particles size of at least 30 μm and the roundness of particles having a particle size of at least 30 μm were measured, and the results are shown in Table 1.

The average particle size was measured in such a manner that 0.3 g of a sample was dispersed in water and measured by a laser diffraction system particle size distribution measuring apparatus (CILAS Granurometer "Model 715"). The same applies to the following Examples and Comparative Examples.

EXAMPLES 4 to 6 and COMPARATIVE EXAMPLES 5 to 6

Using the raw powder as used in Example 2, the raw powder was introduced together with an oxygen carrier gas into a propane gas-oxygen flame in the ratio of the amount (kg) of the raw material to the amount ($Nm^3$) of propane gas, as identified in Table 2, and fused and spheroidized. The average particle size of the obtained filler, the wt % of particles having a particle size of at least 30 μm and the roundness of particles having a particle size of at least 30 μm, are shown in Table 2.

EXAMPLES 7 to 15 and COMPARATIVE EXAMPLES 7 to 10

Separately prepared various types of spherical silica were put together and thoroughly mixed to obtain a silica filler having the wt % of particles having a particle size of at least 30 μm, the roundness of particles having a particle size of at least 30 μm and the roundness of particles having a particle size of less than 30 μm, as identified in Table 3. This filler was blended with materials of the following formulation by a mixer to obtain a dry blend.

| | |
|---|---|
| A silica filler as identified in Table 3 | 92 parts by weight |
| 4,4'-Bis (2,3-epoxypropoxy 3,3',5,5'-tetramethylbiphenyl | 4.4 parts by weight |
| Phenol novolak resin (softening point: 85° C.) | 2.3 parts by weight |
| Triphenylphosphine (curing accelerator) | 0.2 part by weight |
| Ester wax (release agent) | 0.6 part by weight |
| Carbon black (colorant) | 0.1 part by weight |
| γ-glycidoxypropyl trimethoxysilane (silane coupling agent) | 0.4 part by weight |

This blend product was heated and kneaded for 5 minutes by means of a mixing roll having a roll surface temperature of 100° C., then cooled and pulverized to obtain different type of epoxy resin composition. Using the composition, the spiral flow and the flexural strength of a molded product were measured, and the results are shown in Table 3.

The spiral flow was measured in accordance with EMMI1-66 (Epoxy Molding Material Institute; Society of Plastic Industry) using a spiral flow mold. The molding temperature was 175° C.

For the flexural strength, a test specimen in accordance with ASTM (D790-58T) was molded under a condition of 175°×120 seconds by means of a low pressure transfer molding machine and cured at 175° C. for 12 hours. Using this test specimen, the flexural test was carried out at room temperature by a method in accordance with ASTM (D790-58T), whereby the flexural strength was measured.

TABLE 1

| | Characteristics of silica raw material | | Characteristics of filler after fusing | | |
|---|---|---|---|---|---|
| | Average particle size (μm) | wt % of particles of at most 10 μm | Average particle size (μm) | wt % of particles of at lease 30 μm | Roundness of particles of at least 30 μm |
| Comparative Example 1 | 18 | 23 | 25 | 45 | 0.74 |
| Comparative Example 2 | 30 | 27 | 45 | 65 | 0.80 |
| Example 1 | 25 | 20 | 29 | 48 | 0.83 |
| Example 2 | 42 | 10 | 45 | 70 | 0.92 |
| Example 3 | 67 | 15 | 69 | 75 | 0.88 |
| Comparative Example 3 | 75 | 22 | 78 | 80 | 0.81 |
| Comparative Example 4 | 65 | 28 | 69 | 68 | 0.79 |

TABLE 2

| | Silica raw material/ propane gas (kg/Nm³) | Characteristics of filler after fusing | | |
|---|---|---|---|---|
| | | Average particle size (μm) | wt % of particles of at lease 30 μm | Roundness of particles of at least 30 μm |
| Comparative Example 5 | 4.5 | 54 | 82 | 0.81 |
| Example 4 | 4 | 49 | 74 | 0.84 |
| Example 5 | 2 | 45 | 70 | 0.92 |
| Example 6 | 1 | 43 | 62 | 0.94 |
| Comparative Example 6 | 0.8 | 42 | 66 | 0.95 |

TABLE 3

| | Characteristics of the filler | | | Characteristics of the resin composition | |
|---|---|---|---|---|---|
| | wt % of particles of at least 30 μm | Roundness of particles of at lease 30 μm | Roundness of particles of less than 30 μm | Flowability (cm) | Flexural strength at room temperature (MPa) |
| Comparative Example 7 | 25 | 0.88 | 0.73 | 86 | 175 |
| Comparative Example 8 | 70 | 0.81 | 0.73 | 91 | 180 |
| Example 7 | 70 | 0.84 | 0.73 | 105 | 210 |
| Example 8 | 70 | 0.88 | 0.73 | 110 | 205 |
| Example 9 | 70 | 0.93 | 0.73 | 122 | 200 |
| Example 10 | 70 | 0.88 | 0.78 | 114 | 210 |
| Example 11 | 35 | 0.88 | 0.75 | 100 | 205 |
| Example 12 | 55 | 0.88 | 0.75 | 106 | 215 |
| Example 13 | 55 | 0.88 | 0.78 | 120 | 210 |
| Example 14 | 55 | 0.88 | 0.85 | 125 | 205 |
| Example 15 | 85 | 0.88 | 0.75 | 115 | 205 |
| Comparative Example 9 | 70 | 0.95 | 0.75 | 124 | 175 |
| Comparative Example 10 | 92 | 0.88 | 0.75 | 102 | 180 |

By the present invention wherein the content of particles having a particle size of at least 30 μm, useful for encapsulating semiconductor chips, is specified and the roundness of particles having a particle size of at least 30 μm is properly adjusted, it has been made possible to obtain a resin composition having the filler highly loaded without deteriorating the flexural strength.

Further, a method for efficiently producing the filler of the present invention has been established, whereby it has been made possible to prepare a package excellent in cracking resistance at the time of soldering.

What is claimed is:

1. A silica filler containing from 30 to 90 wt % of particles having a particle size of at least 30 μm, and a roundness of from 0.83 to 0.94, and containing particles having a particle size of less than 30 μm and a roundness of 0.73 to 0.90.

2. A resin composition for encapsulating semiconductors, which contains from 80 to 95 wt % of a silica filler, wherein the silica filler contains from 30 to 90 wt % of particles having a particle size of at least 30 μm, and a roundness of from 0.83 to 0.94 and containing particles having a particle size of less than 30 μm and a roundness of 0.73 to 0.90.

3. A method for producing a silica filler as defined in claim 1, which comprises providing a silica powder having an average particle size of from 20 to 70 µm and containing at most 25 wt % of particles having a particle size of at most 10 µm, and fusing said silica powder by thermal spraying with a combustible gas-oxygen flame wherein the ratio of the amount (kg) of the silica powder to the amount ($Nm^3$) of the combustible gas is within a range of from 1 to 4 (based on the calorific value of propane gas).

4. The method for producing a silica filler according to claim 3, wherein the silica powder prior to fusing is at least one member selected from particles obtained by pulverizing silica stone or rock crystal or silica sand or particles prepared by granulating silica material having a particle size of at most 10 µm, with an inorganic binder.

* * * * *